(12) United States Patent
Garbe

(10) Patent No.: US 8,276,361 B2
(45) Date of Patent: Oct. 2, 2012

(54) THERMAL PROTECTION SYSTEM AND RELATED METHODS

(75) Inventor: Duane J. Garbe, Mendon, UT (US)

(73) Assignee: Alliant Techsystems Inc., Arlington, VA (US)

( * ) Notice: Subject to any disclaimer, the term of this patent is extended or adjusted under 35 U.S.C. 154(b) by 1048 days.

(21) Appl. No.: 11/763,280

(22) Filed: Jun. 14, 2007

(65) Prior Publication Data
US 2008/0309023 A1    Dec. 18, 2008

(51) Int. Cl.
F02K 9/68 (2006.01)
F16J 15/20 (2006.01)
F16J 15/32 (2006.01)
F16C 33/00 (2006.01)

(52) U.S. Cl. ........ 60/200.1; 277/537; 277/560; 384/626

(58) Field of Classification Search .............. 60/200.1, 60/267; 239/127.1, 265.11; 277/537, 560, 277/355, 412, 417; 384/626
See application file for complete search history.

(56) References Cited

U.S. PATENT DOCUMENTS

| | | |
|---|---|---|
| 3,429,622 A | 2/1969 | Lee et al. |
| 3,519,260 A | 7/1970 | Irwin |
| 3,698,192 A | 10/1972 | Le Febvre, Jr. |
| 3,941,433 A | 3/1976 | Dolling et al. |
| 4,047,667 A | 9/1977 | McCullough et al. |
| 4,108,381 A | 8/1978 | Sottosanti et al. |
| 4,263,243 A | 4/1981 | Wilson et al. |
| 4,708,758 A | 11/1987 | McGregor |
| 4,927,481 A | 5/1990 | McGregor |
| 5,048,289 A * | 9/1991 | Brown ........................ 60/267 |
| H1381 H * | 12/1994 | Leavitt et al. |
| 5,522,214 A * | 6/1996 | Beckett et al. .............. 60/517 |
| 6,446,979 B1 | 9/2002 | Steinetz et al. |
| 2004/0052637 A1* | 3/2004 | Paprotna et al. .......... 415/170.1 |
| 2005/0206097 A1* | 9/2005 | Datta ......................... 277/644 |

OTHER PUBLICATIONS

Morton Thiokol, Inc., Block II SRM Conceptual Design Studies Final Report, vol. 1, Book 2, pp. 22 and 33, Dec. 19, 1986.

* cited by examiner

Primary Examiner — Ehud Gartenberg
Assistant Examiner — Arun Goyal
(74) Attorney, Agent, or Firm — TraskBritt

(57) ABSTRACT

A thermal protection system and a method of manufacturing are disclosed. The thermal protection system may be configured to protect a movable joint, for example, a flexible bearing of a rocket motor nozzle. The thermal protection system includes a series of annular shims separated by a plurality of discrete spacers. Each shim of the series of annular shims may have a larger diameter than the previous shim, and the shims may nest. The shims may comprise a thermally stable material, and the discrete spacers may comprise an elastomer. Optionally, an annular bearing protector may separate the annular shims from the flexible bearing.

24 Claims, 7 Drawing Sheets

THERMAL PROTECTION SYSTEM AND RELATED METHODS

STATEMENT REGARDING FEDERALLY SPONSORED RESEARCH OR DEVELOPMENT

This invention was made with Government support under Contract No. NAS8-97238 awarded by the National Aeronautics and Space Administration (NASA). The Government has certain rights in this invention.

FIELD OF THE INVENTION

Embodiments of the present invention relate to thermal protection systems and related methods for movable joints, and, more specifically, a thermal protection system for a flexible bearing for use with a movable thrust nozzle of a rocket motor

BACKGROUND OF THE INVENTION

A conventional flexible bearing may comprise a lamination of alternating layers of an elastomeric material and rigid reinforcement shims that are stacked and bonded together. Both the top and bottom layers may be an elastomer, and the lamination is positioned between and bonded to metallic end rings. One end ring may comprise the thrust-nozzle ring of a rocket motor, and the other may comprise the rocket case mounting ring. The lamination may be laterally flexible, that is, in directions parallel to the layers, but unyielding in the directions perpendicular to the layers.

A flexible bearing used in a rocket motor application is exposed to excessive heat and/or flame. The rigid reinforcement shims of the bearing may be metal, and may withstand the heat. However, the elastomer layers may deteriorate, beginning with the peripheral portions which are exposed to the heat or flame. The deterioration adversely affects the incompressibility of the laminated stack and the ability of the stack to accommodate torsional rotation.

One solution to the need for thermal protection of a flexible bearing is disclosed in U.S. Pat. No. 3,519,260 to Irwin. The laminated bearing stack is alternate layers of elastomer and bearing material, and the peripheries of the bearing material extend beyond the peripheries of the elastomer layers. The extension of the bearing material layers beyond the elastomer layers provides flame traps between the bearing material layers. In addition, the extension of the bearing material layers provides heat radiating vanes along the periphery of the flexible bearing.

A drawback to the extended bearing material design for a flexible bearing is that any damage to extended bearing material layers requires the entire flexible bearing to be replaced. The flexible bearing is an expensive component; therefore, frequent replacement is not desirable.

Another thermal protection device for a flexible bearing is disclosed in U.S. Pat. No. 4,263,243 to Wilson, the disclosure of which is incorporated herein by this reference. The protective heat and flame barrier is formed by providing an especially refractory outer edge on each shim, which extends beyond the layers of elastomer. The protective edge is formed on each shim by attaching an edging of resin-filled cloth, of especially refractory properties, to the outer edge of at least some of the segments before arranging them in a mold.

Any damage to the protective edge of the Wilson thermal protection device will result in a reduction in thermal protection, or the entire bearing must be replaced. In addition, the bearing having protective edges acts as a pressure barrier, trapping heated gases between the protective edges and the elastomer layers.

Therefore, there is a need for a thermal protection system for a flexible bearing which is replaceable, flexible, and does not act as a pressure barrier.

BRIEF SUMMARY OF THE INVENTION

In accordance with various embodiments of the present invention, thermal protection systems, a rocket motor including a thermal protection system, and related methods are provided. In accordance with one embodiment of the present invention, a thermal protection system for a movable joint is provided. The system includes a plurality of nested annular shims of a cloth composite, and a plurality of discrete spacers disposed between the shims. Each discrete spacer may comprise, for example, an elastomer, and the cloth composite may comprise, for example, a carbon cloth and a phenolic resin or a glass cloth and a phenolic resin.

The nested annular shims may each have a surface conforming to a surface of a concentric sphere, and may be nested between end rings of a cloth composite. The discrete spacers enable air flow between the shims, and enable the shims to move relative to one another so the thermal protection system may flex with the movable joint.

In one embodiment of the present invention, the discrete spacers may include an elastomer portion and a metal cap. In another embodiment of the present invention, the discrete spacers may each comprise a spring.

In another embodiment of the present invention, a rocket motor may comprise a movable thrust nozzle, including a flexible bearing, and a thermal protection system disposed about the movable thrust nozzle adjacent to the flexible bearing. The flexible bearing may comprise a plurality of elastomer layers stacked alternately with rigid layers. The thermal protection system may comprise a plurality of nested annular shims of a cloth composite and a plurality of discrete spacers disposed between the shims. An annular separator may be positioned between the thermal protection system and the movable thrust nozzle.

In yet another embodiment of the present invention, a thermal protection system may comprise a plurality of nested annular shims of a cloth composite, and a plurality of spacers disposed between the shims, wherein the spacers include a skid shoe positioned on one surface thereof. The spacers may include an annular cavity of one surface thereof, defining an insulative nub on a circumferential edge thereof, which is not in contact with the skid shoe.

One embodiment of a method of the present invention comprises a method of assembling a thermal protection system, including providing a flexible bearing assembly having an end ring nesting a first annular shim having a plurality of discrete spacers attached thereto within the end ring of the flexible bearing assembly; and nesting at least one second annular shim having a plurality of discrete spacers attached thereto within the first annular shim, the first annular shim at least partially encircling the at least one second annular shim.

Other aspects and advantages will become apparent from the following detailed description, taken in conjunction with the accompanying figures.

BRIEF DESCRIPTION OF THE DRAWINGS

While the specification concludes with claims particularly pointing out and distinctly claiming that which is regarded as the present invention, the advantages of this invention may be more readily ascertained from the following description of the invention when read in conjunction with the accompanying drawings in which:

DETAILED DESCRIPTION

Figure 1:
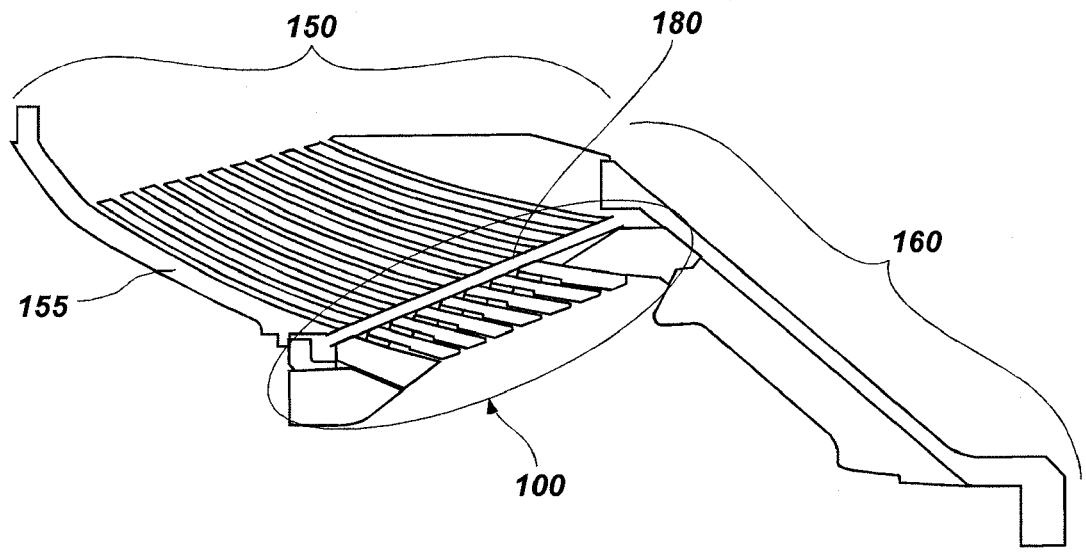
FIG. 1 is a schematic illustration of a thermal protection system according to an embodiment of the present invention.
Figure 2:
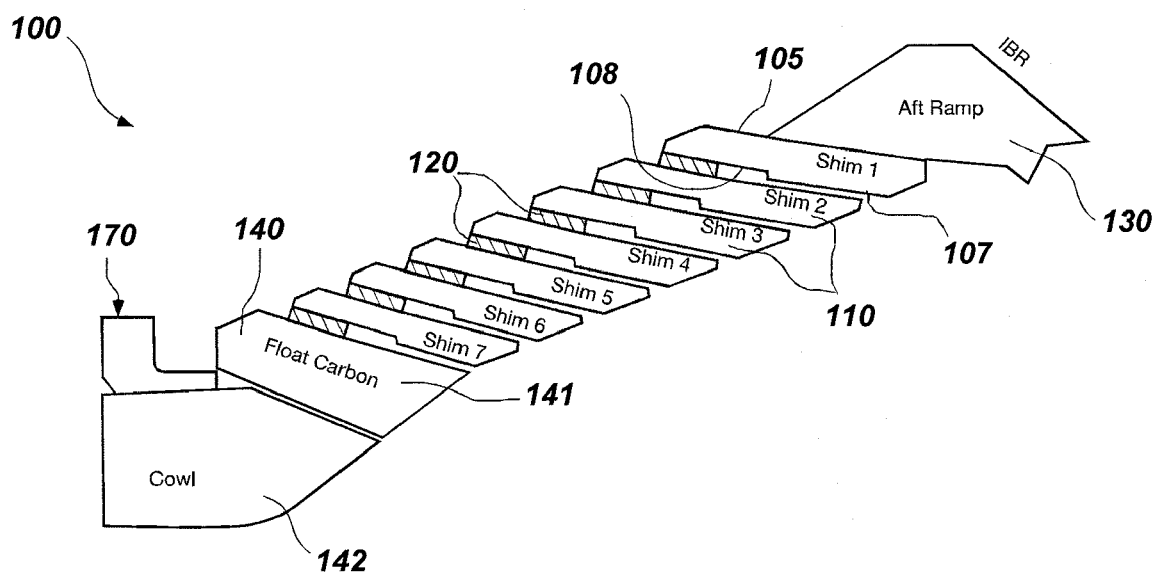
FIG. 2 shows a close-up view of the thermal protection system of FIG. 1.
Figure 3:
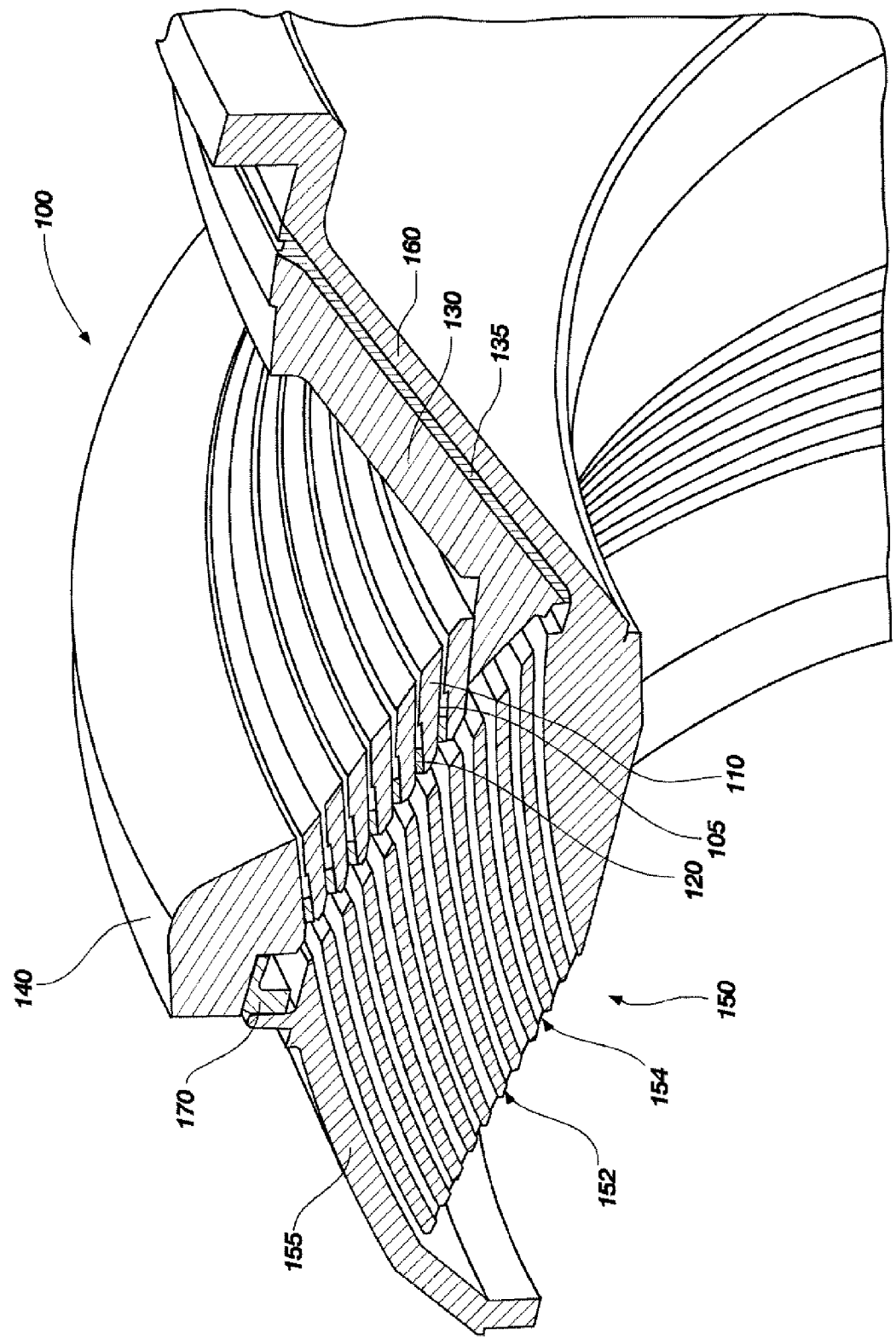
FIG. 3 is a close-up cut-away perspective view of a thermal protection system according to an embodiment of the present invention.

FIG. 1 depicts an embodiment of a flexible bearing assembly 150 and a thermal protection system 100 of the invention. FIG. 2 depicts a close-up view of a portion of the thermal protection system 100. The thermal protection system 100 may be useful with any movable joint, including any ball-type joint, and is depicted in combination with the flexible bearing assembly 150 by way of example and not limitation. The flexible bearing assembly 150 may comprise, for example, a flexible seal and bearing for a rocket nozzle. The flexible bearing assembly 150 shown in FIG. 3 comprises a lamination of alternate layers of an elastomeric material 154 and rigid reinforcement shims 152 that are stacked and bonded together. The flexible bearing assembly 150 may be protected from excessive heat and/or flame by the thermal protection system 100, extending the useable life of the flexible bearing assembly 150.

The thermal protection system 100 may be annular, and include a plurality of shims 110 nested together. The shims 110 may also be annular, and have spacers 120 positioned therebetween. The thermal protection system 100 may further comprise a separator 180 (FIG. 1) positioned between the shims 110 of the thermal protection system and the flexible bearing assembly 150.

Figure 4:
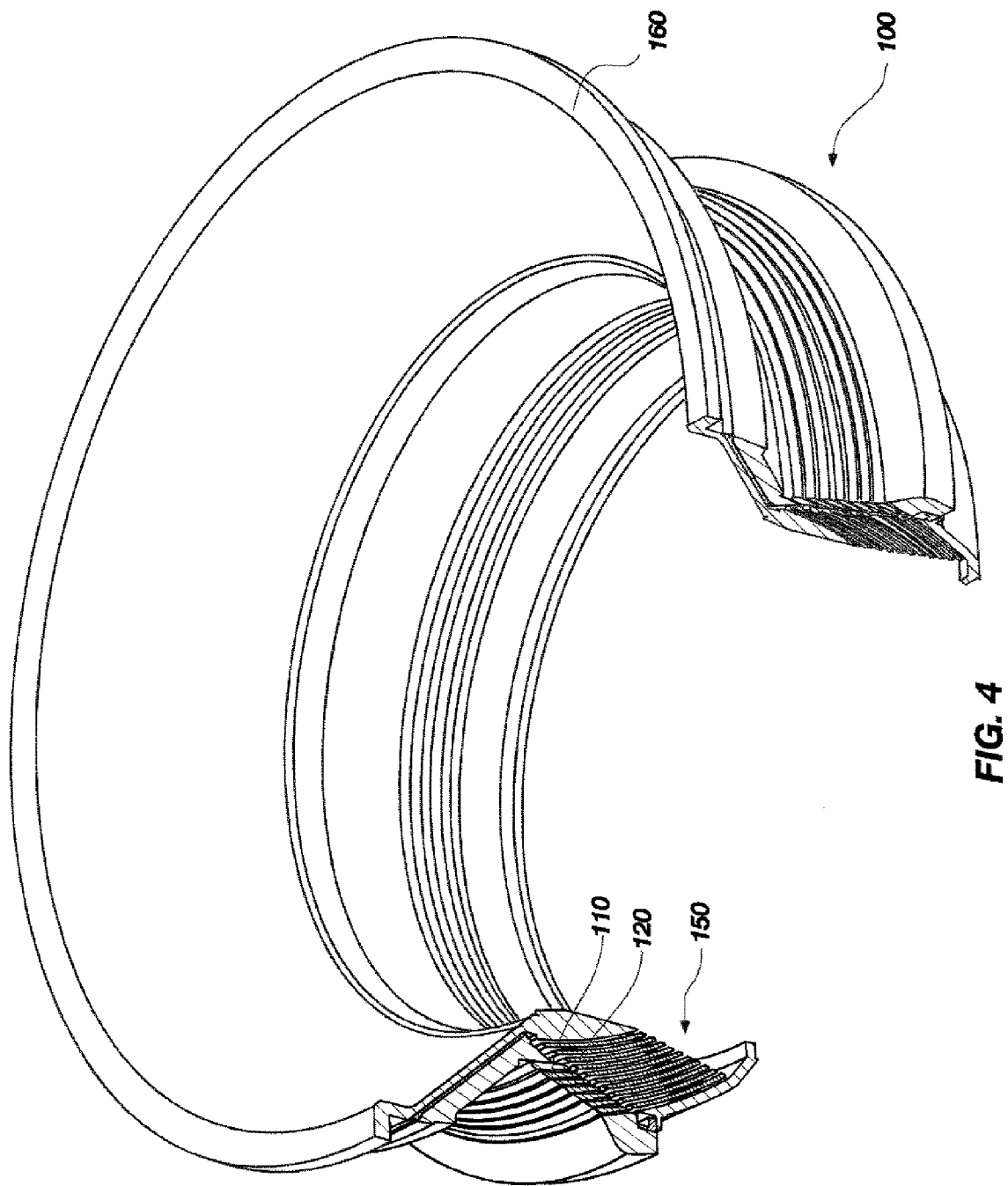
FIG. 4 is a cut-away perspective view of the thermal protection system of FIG. 3.

The shims 110 may comprise a thermally stable material such as a composite, for example, a carbon or glass cloth phenolic composite. The annular shape of the shims is most clearly understood by viewing the cut-away perspective view of FIGS. 3 and 4. The shims 110 may be configured as nested rings with a common center, each shim 110 having a diameter slightly greater than the preceding shim 110, and a spherical curve. That is, an aft face, or inner surface 105 of each shim 110 may correspond to a zone of a sphere having the desired radius. A forward face, or outer surface 107 of each shim 110 may also correspond to a zone of a sphere. Thus, the shims 110 may have surfaces conforming to the surfaces of concentric spheres. The outer surface 107 of each shim 110 may have a notch 108 corresponding to the location of an associated spacer 120.

Figure 6:
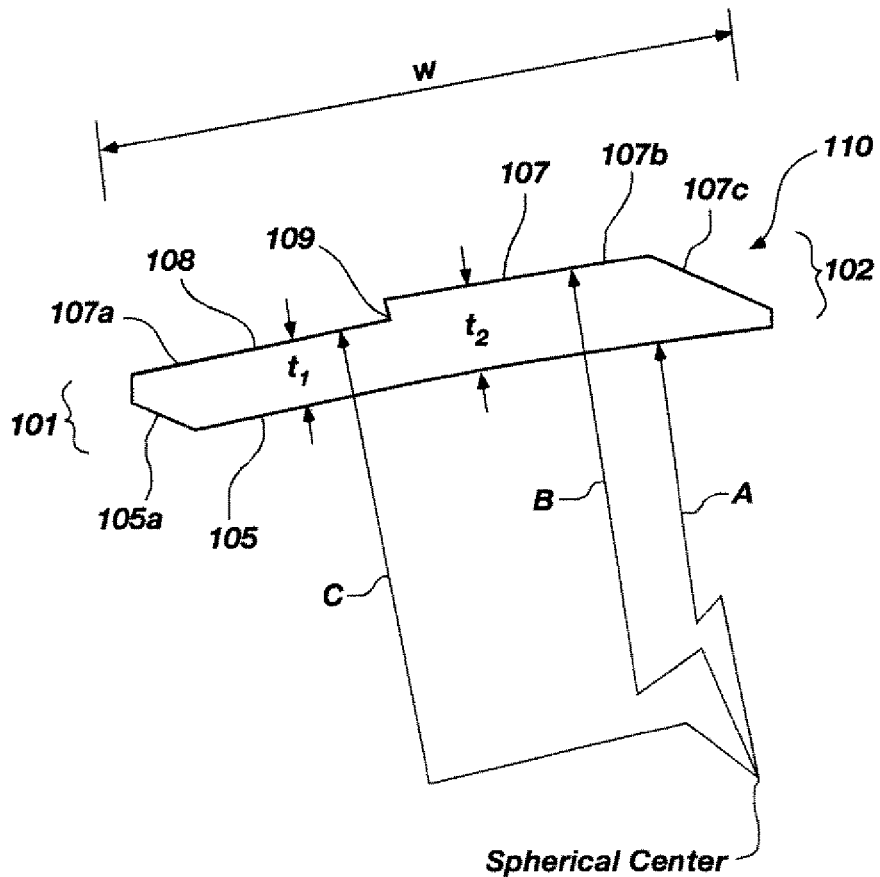
FIG. 6 is a cross-sectional view of a shim of the thermal protection system of the embodiment of FIG. 1.

Turning to FIG. 6, which depicts a cross-sectional view of a portion of a shim 110, the notch 108 may be defined by a first annular end 101 of each shim 110 having a thickness $t_1$ less than the thickness $t_2$ of the opposite, second annular end 102 of each shim 110. A fillet 109 may separate a surface 107a of the notch 108 from a raised portion 107b of the outer surface 107 of the shim 110. The shim 110 may comprise an annular body with a spherical curve, as noted hereinabove. The spherical radius "A" of the inner surface 105, the spherical radius "B" of the raised portion 107b of the outer surface 107, and the spherical radius "C" of the surface 107a of the notch 108 may join at a common spherical center, as shown in FIG. 6.

The inner surface 105 of the shim 110 may include a tapered portion 105a at the first annular end 101 of the shim 110. The outer surface 107 may include a tapered portion 107c at the second annular end 102 of the shim 110. The tapered portions 105a, 107c of the first and second annular ends 101, 102, respectively, may encourage air flow between the adjacent, nested shims 110 of the thermal protection system 100.

Figure 5:
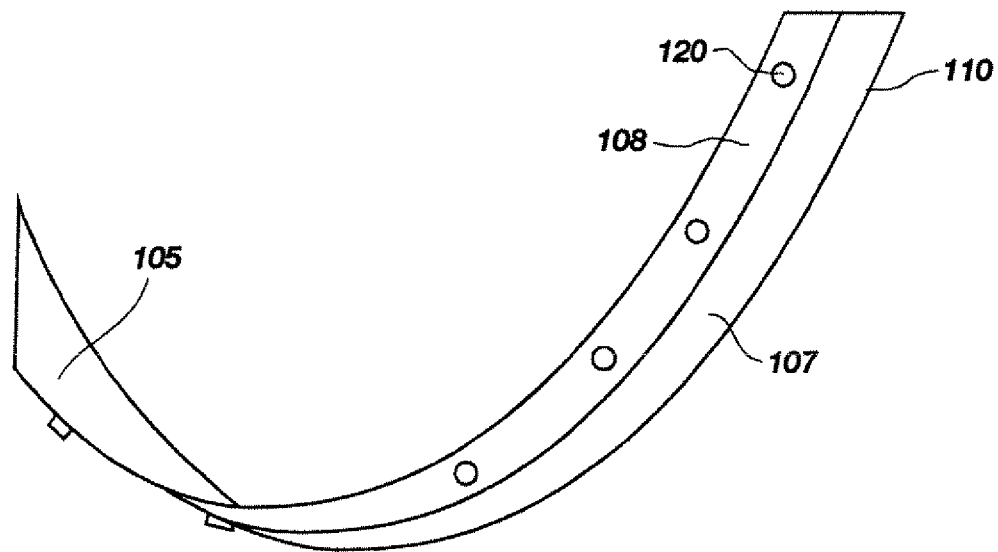
FIG. 5 is an isometric view of a shim of a thermal protection system according to an embodiment of the present invention.

Each shim 110 may have a plurality of spacers 120 bonded thereto, which may be spaced about the outer surface 107 of the shim 110. For example, each shim 110 may have twenty-four spacers 120 associated therewith, each spacer 120 equally spaced about the shim 110. FIG. 5 depicts an isometric view of a shim 110 with spacers 120 bonded to the outer surface 107 thereof. Specifically, the spacers 120 may be bonded to the surface 107a of the notch 108. The inner surface 105 of a successive shim 110 will be spaced apart a predetermined distance from the outer surface 107 of the prior shim by the spacers 120. The predetermined distance between the raised portion 107b of the outer surface 107 and the inner surface of the successive shim 110 will be less than the depth of the spacer 120 because of the notch 108.

Alternatively, the spacers 120 may be bonded to the inner surface 105 of each shim 110. The spacers 120 may be received by the notch 108 on the successive shim 110, or the inner surface 105 of each shim may include a notch therein. It is also within the scope of the present invention for each shim 110 to have a uniform thickness $t_2$ over the width "w," and the thickness of the spacers 120 may define the distance between the shims 110.

The spacers 120 may be positioned in discrete locations about the shims 110, enabling air flow between the shims 110. The space between the shims 110 provides a tortuous path for hot gas, effectively cooling the gas that reaches the cool side of the thermal protection system 100, adjacent to the separator 180 and the flexible bearing assembly 150. The hot gas may vent through the shims 100; thus, the thermal protection system 100 does not act like a pressure barrier. The spacers 120 may comprise, for example, rubber buttons or discs. A spacer having any cross-sectional shape is within the scope of the present invention. The spacers 120 may comprise, by way of example, an elastomer, such as polyisoprene, polybutadiene, polychloroprene, polyisobutylene, poly(styrene-butadiene-styrene), a polyurethane, or a silicone.

Returning to FIG. 1, the bearing protector, or separator 180 may comprise an annular structure positioned between the flexible bearing assembly 150 and the shims 110 of the thermal protection system 100. The bearing protector, or separator 180, may comprise a secondary thermal protector, and insulate the flexible bearing assembly 150 from any hot gases which vent into the cavity between the separator 180 and the shims 110 of the thermal protection system 100. The separator 180 may be flexible, and stretch when the flexible bearing assembly 150 is vectored. The separator 180 may comprise, by way of example and not limitation, molded silicone rubber such as room temperature vulcanizing (RTV) silicone. Other suitable materials for the separator 180 include a filled or unfilled elastomer including nitrile butadiene rubber (NBR) and ethylene-propylene-diene monomer (EPDM).

The separator 180 may be attached to a fixed housing 160 on the inside, and a metallic bracket 170, also known as a cowl housing, on the outside, The separator 180 may further include end rings (not shown) to facilitate the attachment thereof. The end rings may comprise, by way of example, a carbon or glass cloth phenolic composite.

The thermal protection system 100 may be assembled by nesting the shims 110 on the flexible bearing assembly 150 of a rocket motor. Returning to FIG. 3, as an example, a first (or forward) end ring 140 (comprising, for example, a float carbon 141 and a cowl 142 (FIG. 2) of the thermal protection system 100 may be attached to the end ring 155 of the flexible bearing assembly 150 of the rocket motor. The metallic bracket 170 may be positioned between the first end ring 140 and the end ring 155 of the flexible bearing assembly 150. Shim 7 (FIG. 2) with spacers 120 may be nested in the first end ring 140, and may be affixed to the first end ring 140, for example, with an adhesive. Alternatively, the annular geometry of shim 7 may retain the shim in the proper position. Next, shim 6 may be nested in shim 7, shim 5 may be nested in shim 6, continuing until all of the shims are in place.

The shims 110 may be nested and stacked within the flexible bearing assembly 150 without bonding or otherwise attaching the shims. 110 to one another. Rather, each shim includes spacers 120 bonded to only one surface thereof. For example, shim 1 (FIG. 2) has spacers 120 bonded thereto, and the successive shim 2 rests against the spacers 120 of the preceding shim 1. The geometry of the shims and other components mechanically locks the shims in place. FIGS. 1-4 depict a thermal protection system with seven shims; however, a thermal protection system having any number of shims is within the scope of the present invention. h is also within the scope of the present invention for the successive shims to be affixed, for example, by bonding or with an adhesive, to the spacers 120 of the prior shim.

After all of the shims 110 are assembled in a nested formation, the second (aft) end ring 130 may be nested in the last shim 110. The second end ring 130 may comprise, for example, an all ramp 135 secured to the fixed housing 160 with an adhesive, for example, a TIGA adhesive, available from Resin Technology Group, LLC of South Easton, MA, with a glass cloth phenolic positioned therebetween. It will be understood that the thermal protection system 100 of the present invention may be assembled on, and used with a rocket motor, or any other structure which includes a movable joint.

The thermal protection system 100 may be disassembled by first removing the fixed housing 160 and the associated second end ring 130. Then, each shim 110 may be lifted off of the flexible bearing assembly 150.

The movement of the thermal protection system 100 is driven by the flexible bearing assembly 150, in conjunction with the end rings 130, 140. As the rocket nozzle moves, the flexible bearing assembly 150 moves, and the first, forward end ring 140 will move with the flexible bearing assembly 150. The second, aft end ring 130 is stationary, fixed to the fixed housing 160. The movement of the end rings 130, 140 relative to one another drives the movement of the shims 110 of the thermal protection system 100 in conjunction with the flexible bearing 150. The shims 110 rotate about a common pivot point that is the spherical center of the shims 110.

Figure 7:
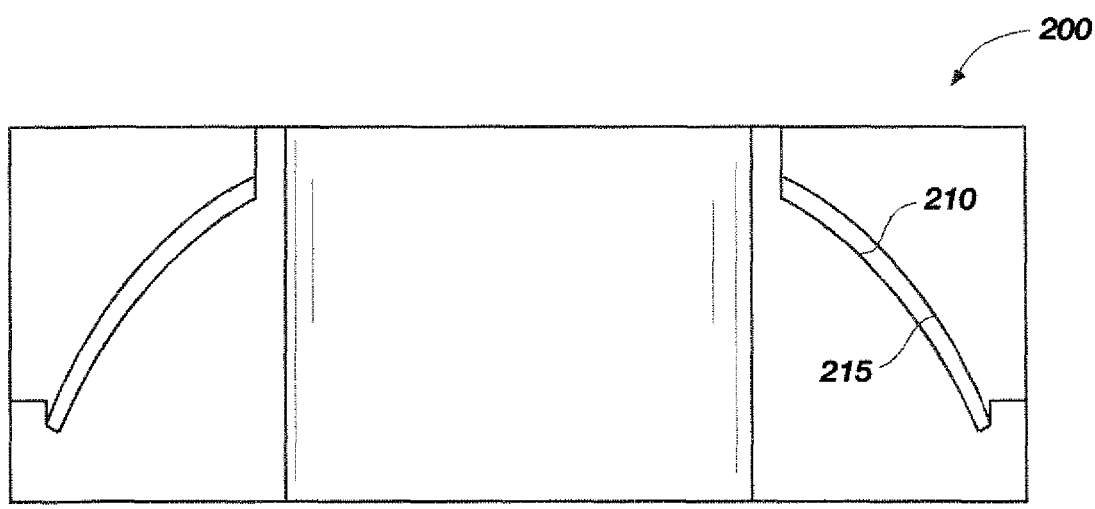
FIG. 7 depicts one embodiment of a mold of the present invention.

The shims 110 may be formed by molding. Turning to FIG. 7, a mold 200 includes a convex mold surface 210 shaped in the zone of a sphere with the radius of the particular shim. A fiber cloth, for example a carbon or glass cloth may be filled with a resin, for example a phenolic resin, and partially cured for easier handling. The cloth is then arranged on the convex mold surface 210. A concave mold surface 215 may be parallel with the convex mold surface 210, but have a larger radius by the desired thickness of the shim. The concave mold surface 215 is arranged over the resin and cloth on the convex mold surface 210, and heat and pressure may be applied to cure the resin.

The mold surfaces 210, 215 may be coated with a release agent, such as TEFLON®, prior to molding, in order to facilitate removal of the finished shim.

Figure 8B:
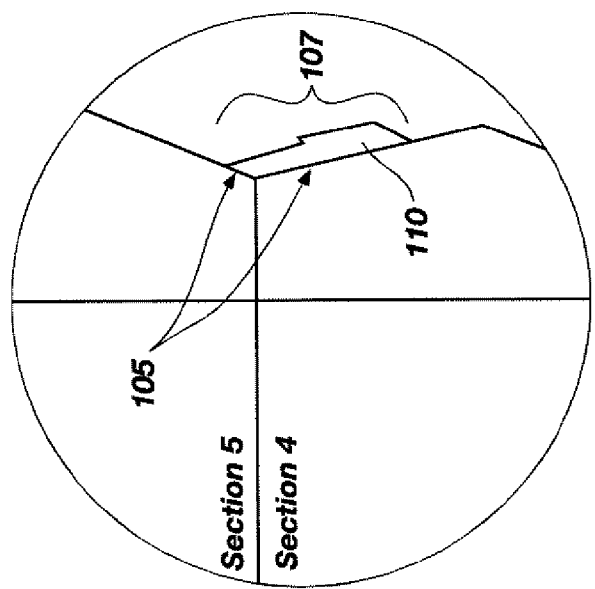
FIGS. 8A and 8B illustrate one embodiment of a method of making a shim according to an embodiment of the present invention.
Figure 8A:
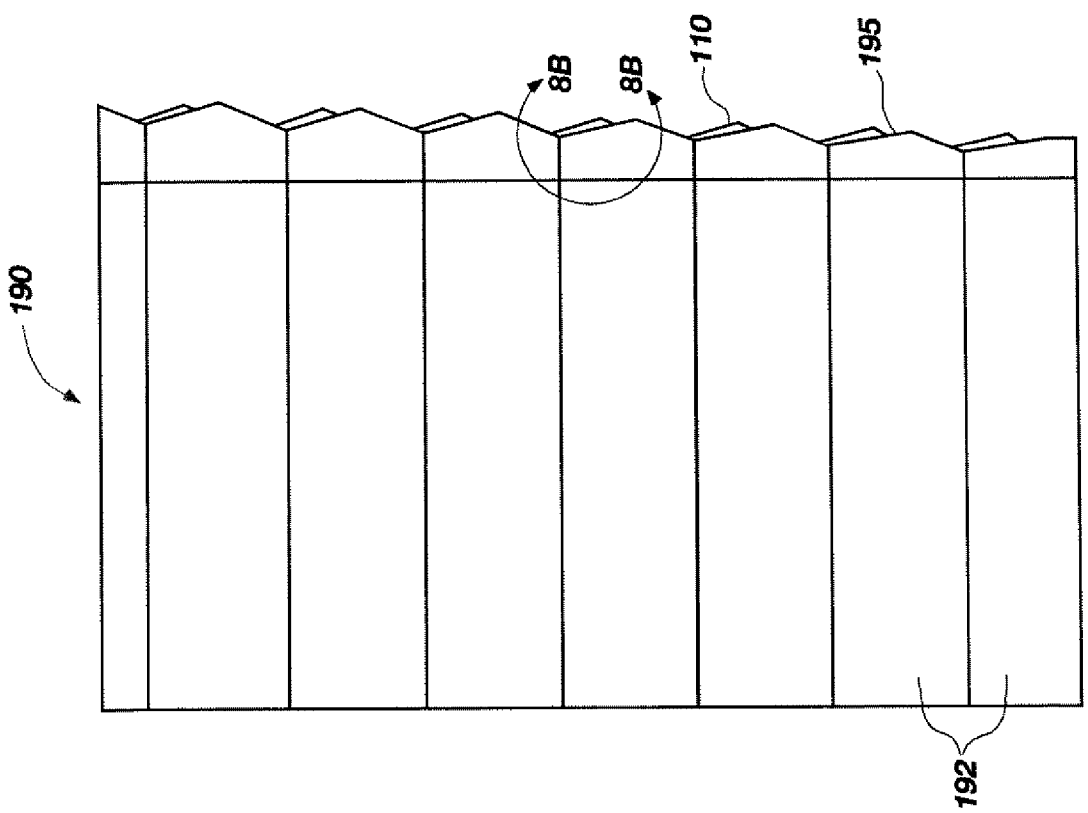

FIGS. 8A and 8B illustrate a method of making a shim according to another embodiment of the present invention. The shims 110 may be formed by wrapping a buildup of composite layers onto a mandrel 190, for example using net-molding techniques. The mandrel 190 may comprise a plurality of separable stacked substantially cylindrical sections 192, each having a convex mold surface 195. Each convex mold surface 195 may be sized with the desired spherical radius for each shim 110, for example, the spherical radius "A" as shown in FIG. 6. The wrapped part may then be cured in an autoclave and then machined to the desired profile, for example, the profile shown in FIG. 6. FIG. 8B illustrates the net-molded inner surfaces 105, and the machined outer surfaces 107 of the finished shim 110. The cylindrical sections 192 may be separated to remove the finished shims 110.

Spacers 120 may be attached to each shim in spaced arrangement thereabout. The spacers 120 may be attached, for example, with an adhesive, or by bonding. Applying heat in order to bond the spacers 120 may vulcanize the elastomer of the spacer 120. The thermal protection system 100 may be assembled as described hereinabove on the object with which it is to be used, for example, on the flexible bearing assembly 150 and fixed housing 160 of the rocket motor.

Figure 9:
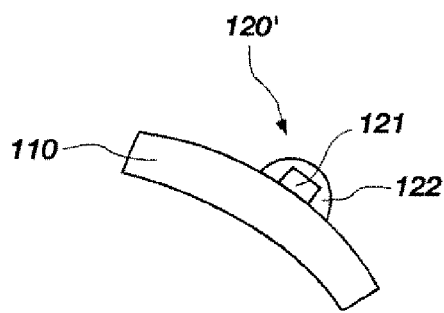
FIG. 9 depicts a shim and spacer according to another embodiment of the present invention.

Another embodiment of a thermal protection system 100 of the present invention includes a plurality of nested shims 110 having spacers 120' positioned therebetween. One shim with a spacer 120' is depicted in FIG. 9. The spacers 120' may comprise an elastomer portion 121 and a cap 122. The elastomer portion 121 may comprise a cylindrical button, and may comprise any of the materials described hereinabove with respect to the spacer 120. The cap 122 may substantially cover the elastomer portion 121. The cap 122 may enable the shims 110 to slide on one another with less friction, and may increase the flexibility of the thermal protection system 100, when compared to a thermal protection system with spacers 120 having no caps. The cap 122 may comprise a metal, for example, an alloy such as steel.

Figure 10:
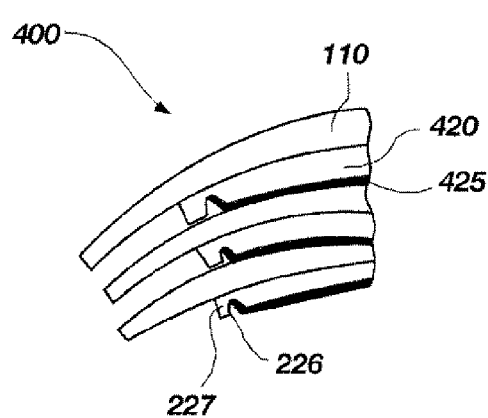
FIG. 10 depicts a thermal protection system according to yet another embodiment of the present invention.

A thermal protection system 400, according to yet another embodiment of the present invention, is shown in FIG. 10. The thermal protection system 400 includes a plurality of nested shims 110 having spacers 420 positioned therebetween. The spacers 420 may comprise annular bodies, with skid shoes 425 thereon. The skid shoes 425 may comprise a metal, and may enable the shims 110 to slide on one another with less friction, and may increase the flexibility of the thermal protection system 400.

One end of the spacers 420 may include an annular cavity 226, separating an annular insulative nub 227 from the skid shoe 425. The annular insulative nub 227 extends from the outer surface of one shim to the inner surface of the prior shim, and may prevent hot gases from contacting the skid shoe 425, which may be formed of a thermally conductive material. Thus, the thermal protection system 400 may prevent flames and hot gases from deteriorating the flexible bearing assembly 150 (FIG. 1), and may provide more flexibility than a conventional thermal barrier.

Figure 11A:
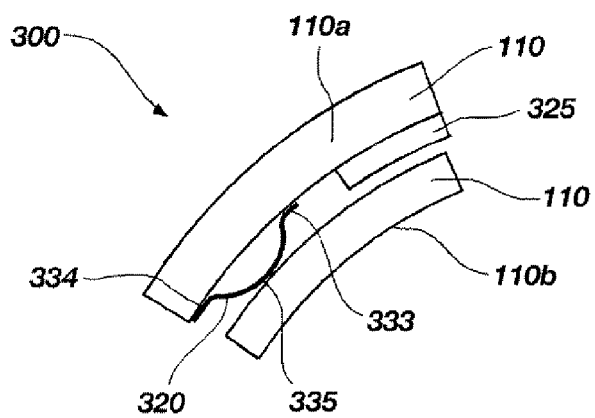
FIGS. 11A and 11B illustrate a thermal protection system according to still another embodiment of the present invention
Figure 11B:
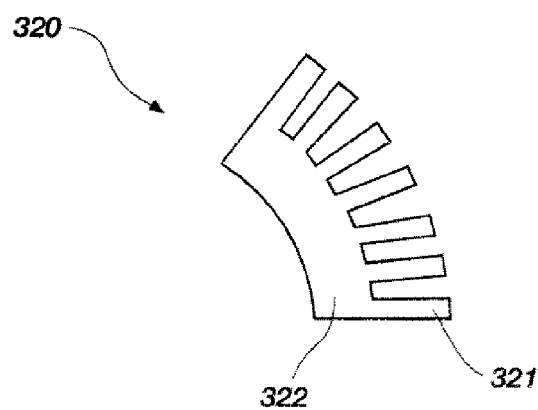

FIGS. 11A and 11B illustrate a thermal protection system 300 according to still another embodiment of the present invention. The thermal protection system 300 includes a plurality of nested shims 110 with spacers 320 positioned therebetween. The spacers 320 may comprise leaf springs with end portions 333, 334 attached to either the inner or the outer surface of an associated shim 110*a*. The spacer may comprise an arc-shape, and a central portion 335 of the spacer 320 may not directly contact with the associated shim 110*a*; rather, the central portion 335 may contact a successive shim 110*b*, spacing it apart from the associated shim 110*a*. A spacer comprising a cantilever spring, fixed at one end, is also within the scope of the present invention. The spacers 320 may be flexible, or spring-like, enabling the shims 110*a*, 110*b* to move with respect to one another, coming closer together or farther apart. FIG. 11A depicts a side, cut-away view of the shims 110 and spacer 320. FIG. 11B depicts a top-view of the spacer 320. The spacer 320 may include a body portion 322 and radially extending fingers 321, and may comprise, for example, a composite material. A spacer comprising a spring with a continuous body, and no radially extending fingers is also within the scope of the present invention. Each shim 110 may have a plurality of discrete spacers 320 associated therewith.

Returning to FIG. 11A, the thermal protection system 300 may further include a heat barrier 325. The heat barrier 325 may comprise an annular structure, and may comprise, for example, a rubber material. The heat barrier 325 may be attached to an associated shim 110*a*, but may be spaced apart from the successive shim 110*b*. The distance of the space is exaggerated for clarity in FIG. 11A. The heat barrier 325 may block hot air and/or radiant heat from reaching the spacer 320, and potentially degrading the spacer 320. The space between the heat barrier 325 and the successive shim 110*b* may enable the shims to move with respect to one another, without additional resistance.

The thermal protection system 100, 300, 400 of the present invention may be easily disassembled and separated from the flexible bearing assembly 150. If needed, individual shims 110 of the thermal protection system 100, 300, 400 may be replaced, rather than replacing the entire system or the bearing. This represents a significant cost savings. The thermal protection system 100, 300, 400 of the present invention may weigh less than a conventional thermal barrier. For example, the laminated bearing stack disclosed in U.S. Pat. No. 3,519,260 to Irwin includes extended metal shims, which are substantially heavier than the composite shims of the thermal protection system 100, 300, 400 of the present invention. U.S. Pat. No. 4,263,243 to Wilson describes a protective heat and flame barrier formed by providing an especially refractory outer edge on each shim. The space between all of the shims is packed with solid elastomer, resulting in a heavier barrier.

The thermal protection system 100, 300, 400 of the present invention exhibits less resistance to movement than a conventional thermal barrier. The shims 110 may or may not be bonded together. The minimal amount of material of spacers 120, 120', 320, 420 or shear material allows the shims 110 to move with the flexible bearing assembly 150 under little applied force. In addition, the thermal protection system 100, 300, 400 of the present invention has the benefit of a simple assembly, predictable performance, and relatively low production cost.

Although the foregoing description contains many specifics, these should not be construed as limiting the scope of the present invention, but merely as providing illustrations of some exemplary embodiments. Similarly, other embodiments of the invention may be devised that do not depart from the spirit or scope of the present invention. Features from different embodiments may be employed in combination. The scope of the invention is, therefore, indicated and limited only by the appended claims and their legal equivalents, rather than by the foregoing description. All additions, deletions, and modifications to the invention, as disclosed herein, which fall within the meaning and scope of the claims are to be embraced thereby.

What is claimed is:

1. A thermal protection system for a movable joint of a rocket motor, the thermal protection system comprising:
   a plurality of nested annular shims comprising a cloth composite; and
   a plurality of discrete spacers disposed between at least two adjacent nested annular shims of the plurality of nested annular shims, the plurality of discrete spacers defining gas-flow spaces between adjacent discrete spacers and between the at least two adjacent nested annular, shims, the gas-flow spaces configured to accommodate flow of gas between the adjacent discrete spacers and between the at least two adjacent nested annular shims.

2. The thermal protection system of claim 1, wherein each discrete spacer of the plurality of discrete spacers comprises an elastomer.

3. The thermal protection system of claim 1, wherein the cloth composite comprises a carbon cloth and a phenolic resin.

4. The thermal protection system of claim 1, wherein the cloth composite comprises a glass cloth and a phenolic resin.

5. The thermal protection system of claim 1, wherein each discrete spacer of the plurality of discrete spacers is disc-shaped, a plurality of the disc-shaped discrete spacers being disposed in a spaced arrangement along a surface of one of the plurality of nested shims.

6. The thermal protection system of claim 1, wherein each nested annular shim of the plurality of nested annular shims has a surface conforming to a surface of a concentric sphere.

7. The thermal protection system of claim 1, wherein at least some of the plurality of discrete spacers are bonded to a surface of at least one nested annular shim of the plurality of nested annular shims.

8. The thermal protection system of claim 7, wherein the at least some of the plurality of discrete spacers are bonded to a surface within an annular notch extending into the at least one nested annular shim of the plurality of nested annular shims.

9. The thermal protection system of claim 1, further comprising end rings comprising the cloth composite.

10. The thermal protection system of claim 1, wherein each discrete spacer of the plurality of discrete spacers comprises an elastomer portion and a metal cap.

11. The thermal protection system of claim 1, wherein each discrete spacer of the plurality of discrete spacers comprises a spring.

12. The thermal protection system of claim 11, wherein the spring comprises a body portion and radially extending fingers.

13. A rocket motor, comprising:
   a movable thrust nozzle including a flexible bearing assembly;

a thermal protection system disposed about the movable thrust nozzle, adjacent the flexible bearing assembly, the thermal protection system comprising:
- a plurality of nested annular shims comprising a cloth composite; and
- a plurality of discrete spacers disposed between at least two adjacent nested annular shims of the plurality of nested annular shims, the plurality of discrete spacers defining gas-flow spaces between adjacent discrete spacers and between the at least two adjacent nested annular shims, the gas-flow spaces configured to accommodate flow of gas between the adjacent spacers and between the at least two adjacent nested annular shims.

14. The rocket motor of claim 13, further comprising a separator positioned between the thermal protection system and the movable thrust nozzle.

15. The rocket motor of claim 14, wherein the separator comprises an annular body of silicone.

16. The rocket motor of claim 13, wherein the flexible bearing assembly comprises a plurality of elastomer layers stacked alternately with rigid layers.

17. The rocket motor of claim 13, further comprising a first end ring positioned between the plurality of nested annular shims and a fixed housing of the movable thrust nozzle.

18. The rocket motor of claim 17, further comprising a second end ring positioned between the plurality of nested annular shims and an end ring of the flexible bearing assembly.

19. A thermal protection system of a rocket motor, comprising:
- a plurality of nested annular shims comprising a cloth composite; and
- a plurality of spacers disposed between at least two adjacent nested annular shims of the plurality of nested annular shims, each spacer of the plurality of spacers comprising a skid shoe positioned on a surface thereof;
- wherein the plurality of spacers define tortuous paths between adjacent spacers and between the at least two adjacent nested annular shims, the tortuous paths configured to accommodate passage of gas between the adjacent spacers and longitudinally across a surface of each of the at least two adjacent nested annular shims.

20. The thermal protection system of claim 19, wherein each spacer of the plurality of spacers comprises:
- an annular cavity extending from an opening in a surface thereof; and
- an insulative nub on a circumferential edge of the spacer, the insulative nub spaced apart from the skid shoe.

21. A method of assembling a thermal protection system of a rocket motor, comprising:
- nesting a first annular shim having a plurality of discrete spacers attached thereto within an end ring of a flexible bearing assembly;
- nesting at least one second annular shim having a plurality of discrete spacers attached thereto within the first annular shim, the first annular shim located adjacent to and at least partially encircling the at least one second annular shim; and
- defining gas-flow spaces between adjacent discrete spacers and between the first annular shim and the at least one second annular shim, the gas-flow spaces configured to accommodate flow of gas between the adjacent discrete spacers and between the first annular shim and the at least one second annular shim.

22. The method of claim 21, further comprising mechanically locking the first annular shim against the end ring of the flexible bearing assembly with the at least one second annular shim.

23. The method of claim 21, further comprising bonding at least some of the plurality of discrete spacers to the first annular shim.

24. The method of claim 21, further comprising bonding at least some of the plurality of discrete spacers to a surface within an annular notch extending into the first annular shim.

* * * * *